(12) United States Patent
Marmo et al.

(10) Patent No.: US 6,886,936 B2
(45) Date of Patent: May 3, 2005

(54) CONTACT LENSES WITH BLENDED MICROCHANNELS

(75) Inventors: J. Christopher Marmo, Danville, CA (US); Gregg A. Dean, St. Denys (GB)

(73) Assignee: Ocular Sciences, Inc., Concord, CA (US)

( * ) Notice: Subject to any disclaimer, the term of this patent is extended or adjusted under 35 U.S.C. 154(b) by 0 days.

(21) Appl. No.: 10/337,247

(22) Filed: Jan. 6, 2003

(65) Prior Publication Data

US 2003/0151718 A1 Aug. 14, 2003

Related U.S. Application Data

(63) Continuation-in-part of application No. 10/270,025, filed on Oct. 11, 2002, now abandoned, which is a continuation-in-part of application No. 09/910,355, filed on Jul. 20, 2001.
(60) Provisional application No. 60/221,575, filed on Jul. 28, 2000.

(51) Int. Cl.[7] .................................................. G02C 7/04
(52) U.S. Cl. .............................. 351/160 R; 351/160 H
(58) Field of Search ......................... 351/160 R, 160 H, 351/161, 162

(56) References Cited

U.S. PATENT DOCUMENTS

| | | | |
|---|---|---|---|
| 2,393,266 A | 1/1946 | Riddell | 351/160 R |
| 2,989,894 A | 6/1961 | Gordon | 351/160 R |
| 3,228,741 A | 1/1966 | Becker | 351/160 R |
| 3,246,941 A | 4/1966 | Moss | 351/160 R |
| 3,431,046 A | 3/1969 | Conrad et al. | 351/160 R |
| 3,594,074 A * | 7/1971 | Rosen | 351/219 |
| 4,353,849 A | 10/1982 | Lewison | 264/2.7 |
| 4,401,371 A | 8/1983 | Neefe | 351/160 R |
| 4,640,594 A * | 2/1987 | Berger | 351/160 R |
| 4,890,911 A | 1/1990 | Sulc et al. | 351/160 H |
| 5,009,497 A | 4/1991 | Cohen | 351/161 |
| 5,104,213 A | 4/1992 | Wolfson | 351/160 R |
| 5,166,710 A | 11/1992 | Höfer et al. | 351/160 R |
| 5,347,326 A | 9/1994 | Volk | 351/160 R |
| 5,483,304 A | 1/1996 | Porat | 351/161 |
| 5,598,233 A | 1/1997 | Haralambopoulos et al. | 351/160 H |
| 5,849,811 A | 12/1998 | Nicolson et al. | 523/106 |
| 6,652,095 B2 * | 11/2003 | Tung | 351/161 |
| 2003/0095232 A1 * | 5/2003 | Mitsui | 351/176 |

FOREIGN PATENT DOCUMENTS

DE       2546692       4/1977

* cited by examiner

Primary Examiner—Jordan M. Schwartz
(74) Attorney, Agent, or Firm—Greg S. Hollrigel

(57) ABSTRACT

Contact lenses for use in eyes are provided and include a lens body and a plurality of microchannels defined in a posterior face of the lens body. The microchannels are structured to promote effective tear fluid exchange between an exposed surface of the eye and a surface of the eye covered by the lens body. Each of the microchannels preferably includes a substantially junctionless, convex surface along a major portion of a length of the microchannel.

50 Claims, 3 Drawing Sheets

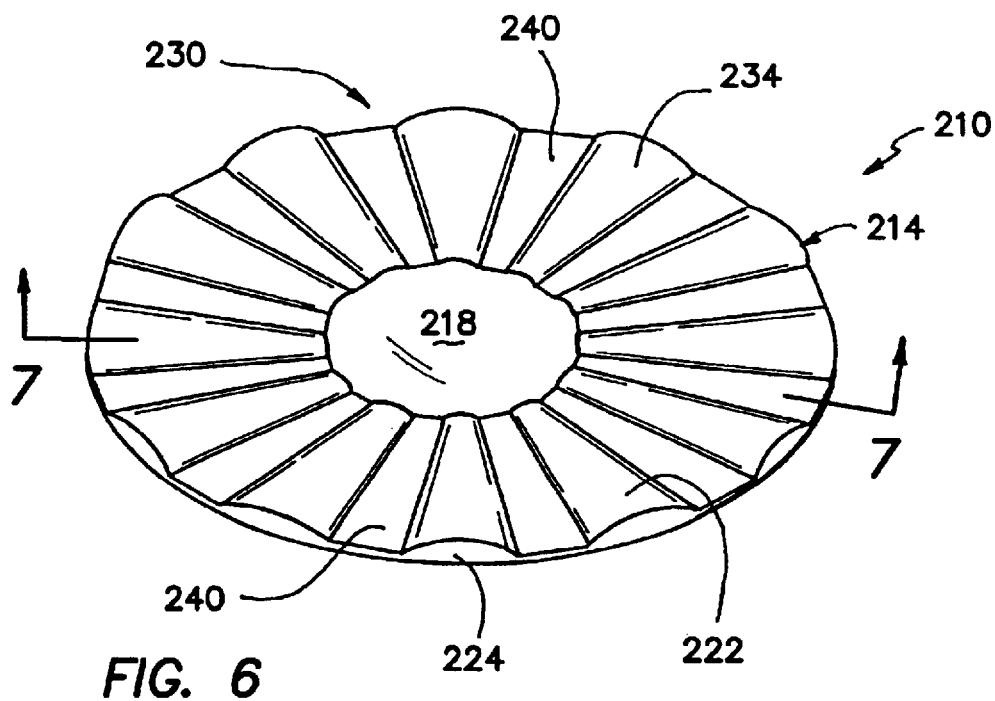
FIG. 6
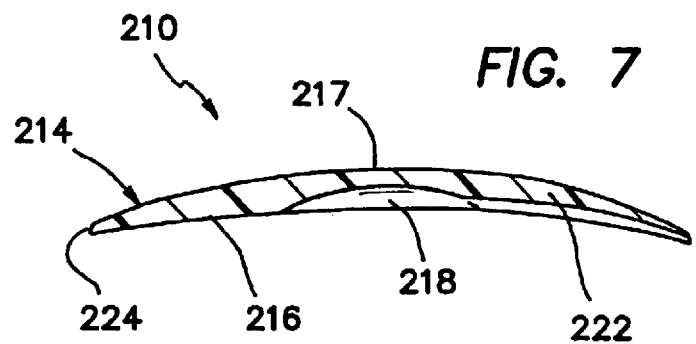
FIG. 7
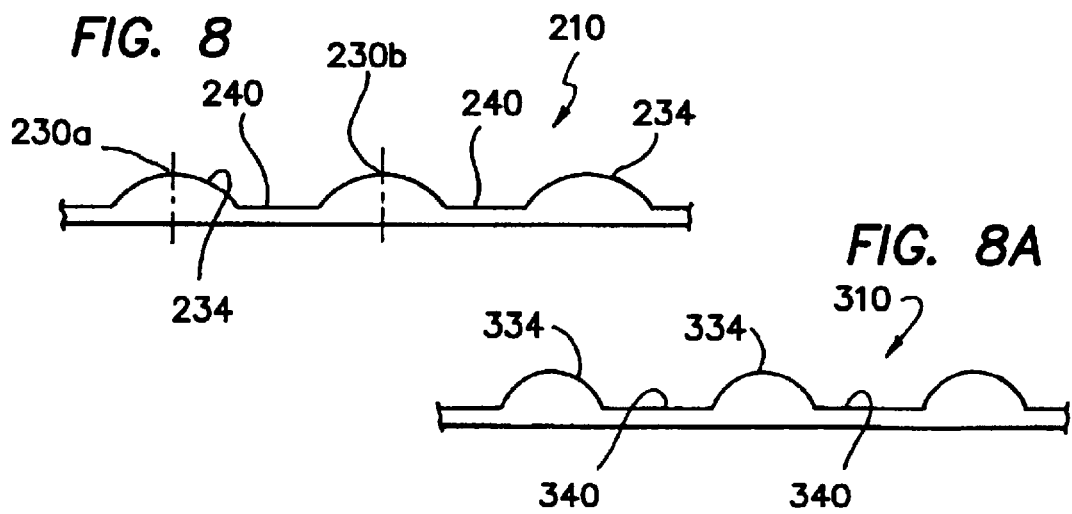
FIG. 8
FIG. 8A

CONTACT LENSES WITH BLENDED MICROCHANNELS

RELATED APPLICATIONS

This application is a continuation-in-part of U.S. patent application Ser. No. 10/270,025, filed Oct. 11, 2002, now abondoned, which is a continuation-in-part of U.S. patent application Ser. No. 09/910,355, filed Jul. 20, 2001, which claims the benefit of U.S. provisional application Ser. No. 60/221,575, filed Jul. 28, 2000, the disclosures of each of these applications being incorporated in their entirety herein by this specific reference.

BACKGROUND OF THE INVENTION

The present invention generally relates to contact lenses and more specifically relates to contact lenses having microchannels that promote effective tear fluid exchange.

It has long been recognized that extended wear of contact lenses can lead to corneal complications. Adverse corneal responses to extended contact lens wear are believed to be primarily caused by accumulation of debris trapped at the lens-eye interface.

The cornea is a living tissue with an active metabolism. Waste products, for example lactic acid, carbon dioxide and water, generated by such metabolism must be expelled from the cornea. Contact lens wear results in debris, for example, derived from such waste products, dead epithelial cells, and other materials which are ordinarily removed from the eye, becoming trapped at the lens-eye interface. Such debris, if left to accumulate in the eye, can harm the eye, for example, causing irritation and/or other harm to the eye and/or to the general ocular health of the lens wearer. In order to remain healthy, the cornea must receive an adequate supply of oxygen as the cornea does not receive oxygen from the blood supply as does other living tissue. If sufficient oxygen does not reach the cornea, corneal swelling occurs.

In order to address the problem of oxygen deprivation due to extended wear of contact lenses, hydrophilic lenses with high oxygen transmission properties were developed. Hydrophilic lenses, also sometimes referred to as hydrogel lenses, are soft, flexible, water-containing lenses. Clinical studies of hydrophilic lenses have indeed shown a relatively lower degree of corneal swelling in persons wearing such lenses, even when worn over an extended time.

Unfortunately, however, the use of conventional hydrophilic lenses have not eliminated all adverse corneal responses to contact lens wear, in particular extended contact lens wear. For example, conventional hydrophilic lenses do not address the problem of debris accumulation at the lens-eye interface. This suggests that in addition to oxygen permeability, there are other considerations to be addressed in the development of a safe, soft contact lens for extended wear.

One important consideration is effective tear film exchange between the exposed surface of the eye and the surface of the eye covered by the lens. Tear fluids provide for hydration of delicate eye tissue and continuous flushing of debris from the eye. Tear film exchange between the eye and the posterior, i.e. eye facing, surface of a contact lens, is believed to be a critical factor in maintaining eye health. Tear film exchange allows for removal of dead epithelial cells, foreign particulate matter and other debris that may otherwise become trapped between the lens and the eye. It has been hypothesized that increased tear film exchange will not only enhance corneal health but will limit complications such as infection in the eye and microbial keratitis.

Rotation of the lens on the eye has long been recognized as a means of maintaining eye health and comfort. For example, Gordon U.S. Pat. No. 2,989,894 describes a contact lens having five equally spaced, spirally inclined ducts formed on an inner surface of the lens. Each duct is described and shown as extending toward a center of the lens but without extending as far as the corneal region. It is stated that the slow and constant rotation of the lens prevents excess settling of the lens on the cornea. The spiral inclination of the ducts is said to cause the lens to rotate in a clockwise or counterclockwise direction depending upon the direction of inclination.

More recently, Höfer et al U.S. Pat. No. 5,166,710 discloses a contact lens having a corneal region that, when placed on the eye, is spaced apart from the corneal surface. Provision is made for causing the lens to rotate upon eyelid blinking action of the wearer. According to Höfer et al, lacrimal film is transported along the eye surface as a result of a "turbo effect" produced by flattened zones on the lens, which causes the lens to rotate on the eye in response to blinking action. The patent also describes that tear transport may be provided by depressions in the rear face of the lens body. Höfer et al shows and describes that the depressions may be depressed portions of the lens body, within the rear surface thereof, the depressions being groove-like or saw tooth-like in shape. Höfer et al describes that it is also possible to provide "thin wave-like curved channels".

Nicolson et al U.S. Pat. No. 5,849,811 discloses a lens material that was developed to provide a balance of oxygen permeability with ion or water permeability, with the permeability being sufficient to provide contact lens "eye-on movement", i.e. movement of the lens on the eye surface.

The disclosure of each of the patents identified herein is hereby incorporated in its entirety herein by this specific reference.

Despite the advances made in development of comfortable, safe, extended wear contact lenses, there is still a need for an improved contact lens, for example, a lens that promotes effective tear fluid exchange throughout the surface area of the eye, particularly in the area of the cornea.

SUMMARY OF THE INVENTION

New contact lenses effective to promote effective tear fluid exchange between an exposed surface of an eye and a surface of an eye covered by the contact lens have been discovered. Exchange of tear fluid or film from outside the periphery of the lens with tear fluid or film disposed behind the lens, that is between the lens and the eye or at the lens-eye interface, provides for enhanced removal of debris from the lens-eye interface. The tear film located between the cornea and a contact lens is sometimes referred to herein as the post-lens tear film (PoLTF). Consistent flushing of the PoLTF can result in enhanced ocular health and/or long periods of extended contact lens wear with reduced adverse corneal responses.

Contact lenses, for example, extended wear contact lenses, in accordance with the present invention, provide for removal of debris from beneath the contact lens through enhanced tear mixing, for example by consistent flushing of the PoLTF; preferably provide increased delivery of oxygen to the cornea; and preferably do not depend upon rotation of the lens for promoting the effectiveness of tear fluid or film exchange.

In one broad aspect of the present invention, a contact lens is provided which generally comprises a lens body having a posterior face and an anterior face. A plurality of microchannels are defined in the posterior face, and the lens body is structured to reduce the time to exchange 95% of tear fluid, for example, from the PoLTF, such as by at least about 15%, when the lens is worn on the eye, relative to a substantially identical contact lens that does not include, or is without, a plurality of microchannels. In another aspect of the invention, the lens body, preferably including a plurality of microchannels, as described herein, is structured to cause the lens body to flex toward the eye wearing the contact lens in response to the action of an eyelid on the lens body, thereby at least assisting in promoting effective tear fluid exchange between an exposed surface of the eye and a surface of the eye covered by the lens body and preferably to reduce the time to exchange 95% of tear fluid by at least about 15% when the lens is worn on the eye, relative to a substantially identical contact lens that does not so flex.

Without wishing to limit the invention to any particular theory of operation, it is believed that the structure of the lens body, for example in response to a blinking action of the eyelid, is believed to cause the lens to produce a significant pumping or flushing action of tear fluid between the lens and an eye surface covered by the lens. More particularly, in accordance with this aspect of the invention, upon closing of the eyelid, for example during a blinking action, the eyelid pushes the lens closer to the cornea, which squeezes some of the PoLTF out from beneath the lens. Upon the eyelid being subsequently raised, the elasticity of the lens causes the lens to recoil and move away from the cornea thereby drawing tear fluid from the tear film on the surrounding sclera, and effectively replenishing the PoLTF.

In a particular embodiment of the invention, the lens body preferably has a thickness which varies substantially continuously along a radius extending from an optical axis of the lens body circumferentially across at least a portion of each of the microchannels.

For example, the plurality of microchannels defines a waveform, circumferentially. More preferably, the plurality of microchannels defines a substantially continuous, preferably substantially junctionless waveform. Stated another way, the plurality of microchannels preferably defines substantially smooth, substantially continuously curved surfaces, generally extending from an optic of the lens across a peripheral portion of the lens body.

Preferably, each of the microchannels has a width in a range of about 5 degrees and about 30 degrees (for example, in a 360 degree substantially circular array). The plurality of microchannels may comprise between about 3 to about 200 microchannels, more preferably about 10 to about 100 microchannels.

In one embodiment of the invention, the lens includes an optical zone which is substantially free of the plurality of microchannels. For example, the plurality of microchannels may be defined only in a peripheral portion of the lens.

Preferably, each of the microchannels includes a curved surface that is other than convex relative to the anterior face of the lens body. More preferably, each microchannel is substantially continuously curved both radially and circumferentially, wherein "circumferentially" is defined herein as being along at least one radius extending from an optical axis of the lens body.

In a particularly useful embodiment of the invention, at least two microchannels define a waveform circumferentially. As used herein, a waveform is a continuous curve including an apex of each of at least two microchannels. In this context, an apex of a microchannel is the posterior most point of the microchannel. Even more preferably, the plurality of microchannels defines a substantially continuous waveform circumferentially, still more preferably a substantially continuous, substantially junctionless waveform circumferentially, generally having troughs at the thinnest region of the lens body and peaks at the thickest region of the lens body. In a more specific aspect of the invention, the waveform repeats periodically about at least a portion of the circumference of the lens.

In another broad aspect of the invention, a contact lens is provided comprising a lens body having a posterior face and an anterior face, and the lens body includes a plurality of microchannels, each microchannel including a curved surface that is generally other than concave, preferably that is generally convex, to the anterior face of the lens body. Preferably, the curved surface of each microchannel is located in a posterior region of the microchannel.

In one embodiment, the lens body may have a thickness which varies substantially continuously along a radius extending from an optical axis of the lens body across at least a portion, for example, a major portion, or substantially all of each of the microchannels circumferentially. In one embodiment, the lens body has a thickness which varies substantially continuously along a radius extending from the optical axis across only a portion of each of the microchannels circumferentially.

Preferably, each of the microchannels is substantially smooth or junctionless and continuously curved both radially and circumferentially.

Preferably, each of the microchannels has a decreasing taper toward an optical axis of the lens body, in terms of at least one of a width and a depth of the microchannels.

In one embodiment of the invention, the lens includes an optical zone which is substantially free of the plurality of microchannels. For example, the plurality of microchannels may be defined only in a peripheral portion of the lens.

Again, without wishing to limit the invention to any particular theory of operation, it is believed that the generally non-concave curved surfaces of the microchannels are effective in enhancing the tear fluid exchange, for example by at least about 15%, preferably to at least about 35% or more, as described herein, relative to a substantially identical contact lens without microchannels or including microchannels without such curved surfaces.

When using a $T_{95}$ test, as described herein, the present contact lenses are structured to reduce the time to exchange 95% of tear fluid by at least about 15% or at least about 20% or at least about 25% or at least about 30% or at least about 35% or more when the lens is worn on the eye compared to a reference contact lens, for example, a substantially identical contact lens without microchannels, or without microchannels in accordance with the present invention.

In another broad aspect of the invention, a contact lens is provided that generally comprises a lens body and a plurality of microchannels defined in the posterior face of the lens body, with each of the microchannels being located in a substantially abutting relationship to one or more of the microchannels. The microchannels are preferably sized and adapted to promote effective, and more preferably to enhance, tear fluid exchange between an exposed surface of the eye and a surface of the eye covered by the lens body.

Each of the microchannels, for example, abutting microchannels, are preferably sized and/or shaped such as to define a significant open spacing between the posterior face of the lens body and an eye surface when the lens is worn on the eye. For example, the plurality of microchannels may occupy a substantial portion of the posterior face, thereby creating a consistent PoLTF between the eye surface and the lens. For example, in accordance with the present invention, the plurality of microchannels may occupy at least about 10% or about 20% to about 30% or about 50% or more of the portion of the posterior face on which the microchannels are located. Preferably, the contact lens is structured to cause the lens body to flex toward and away from the eye wearing the contact lens in response to the action of an eyelid coming in contact with, and moving away from the lens body, respectively, thereby at least assisting in promoting effective tear fluid exchange between an exposed surface of the eye and a surface of the eye covered by the lens body.

Each abutting microchannel may include a curved surface that is generally other than concave relative to the anterior face of the lens body. For example, each microchannel may include a curved surface that is generally convex relative to the anterior face of the lens body.

Preferably, the contact lenses of the present invention are produced by lathing techniques. More particularly, the plurality of microchannels are preferably lathed on a tooling insert that is used to form a contact lens mold.

Alternatively, the microchannels in the present contact lenses can be provided using any suitable technique or processing or combinations thereof. Preferably, such microchannels are provided during contact lens manufacture using techniques which are conventional and well known in the art. For example, there are at least three opportunities in the process of making contact lens that microchannels can be imparted. These are as follows:

Etching or lathing (preferred) the molding insert using techniques such as chemical, laser, EDM, photolithograph, UV irradiation, micro-machining and the like;

building a relief on a thermoplastic mold using techniques such as microcontact printing and the like; and imparting the microchannels directly on a lens, such as by lasing and the like.

It can be appreciated that when the lens of the present invention is worn for an extended period of time, the tear film at the lens/eye interface is continually flushed with tear fluid from other parts of the eye outside the lens periphery. This flushing of the tear film from the lens-eye interface, which often contains a substantial amount of debris, with "clean" tear film reduces the debris concentration and thereby allows the lens to be worn for a longer period of time before removal from the eye. Even if the lens is not worn for an extended period of time, the continual flushing of the tear film has a significantly advantageous effect on the ocular health of the lens wearer.

Enhanced debris removal in accordance with the present invention is particularly useful in combination with contact lenses having high oxygen permeability, such as hydrophilic contact lenses, for example, contact lenses made of hydrophilic polymeric materials, silicone hydrogel materials and the like.

Each and every feature described herein, and each and every combination of two or more of such features, is included within the scope of the present invention provided that the features included in such a combination are not mutually inconsistent.

These and other aspects of the present invention are set forth in the following detailed description, examples and claims, particularly when considered in conjunction with the accompanying drawings in which like parts bear like reference numerals.

BRIEF DESCRIPTION OF THE DRAWINGS

FIG. 6 is a perspective view of another contact lens in accordance with the present invention.

FIG. 7 is a cross sectional view taken generally along line 7—7 of FIG. 6.

FIG. 8 is a schematic view of the microchannel configuration of the lens shown in FIG. 6.

FIG. 8A is a schematic view of an alternative microchannel configuration of a contact lens of the present invention.

DETAILED DESCRIPTION

Figure 1:
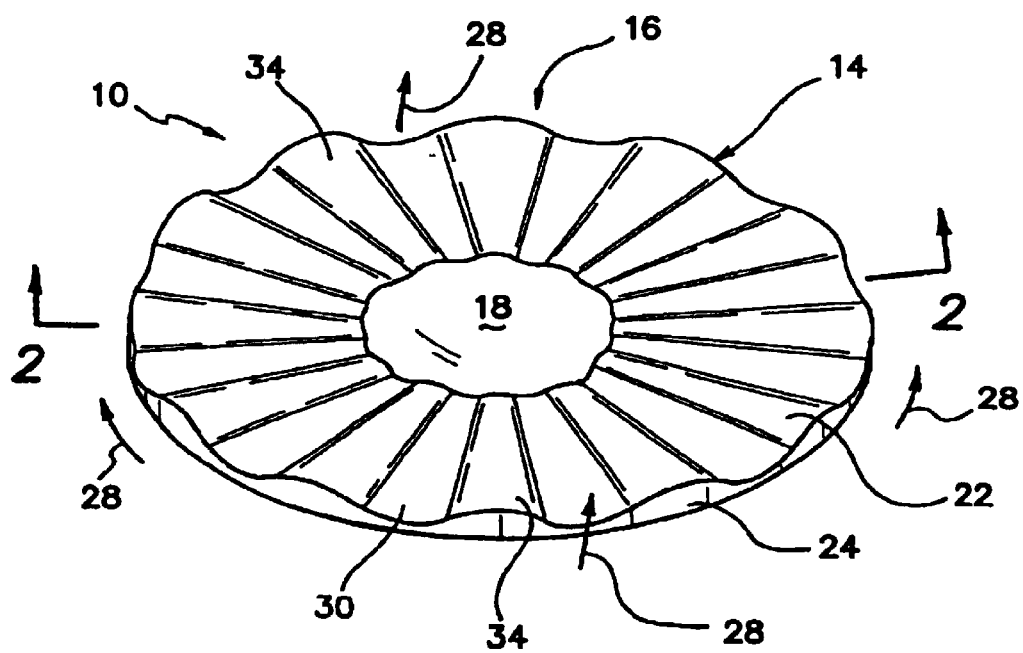
FIG. 1 is a perspective view of a contact lens in accordance with the present invention, the contact lens including a plurality of microchannels defined in a posterior face of the lens.
Figure 2:
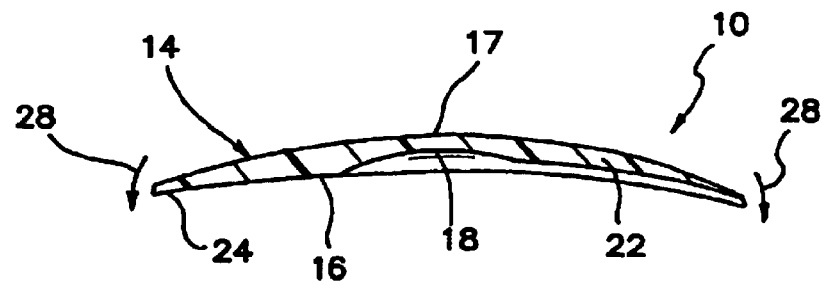
FIG. 2 is a cross sectional view taken generally along line 2—2 of FIG. 1.

Turning now to FIGS. 1 and 2, a contact lens 10 in accordance with the invention is shown. Contact lens 10 includes a lens body 14 with a posterior face 16 and an opposing anterior face 17 (not visible in FIG. 1). The posterior face 16 includes an optical zone 18 configured for vision correction, and a peripheral portion 22 generally surrounding the optical zone 18, and a peripheral edge surface 24. The posterior face 16, as used herein, refers to the surface of the lens 10 which faces toward the eye during wear.

The lens 10 of the present invention generally comprises a plurality of microchannels 30 defined in the posterior face 16. Generally, the lens body 14 is structured to cause the lens body 14 to flex toward the eye wearing the contact lens 10, generally in a direction represented by arrows 28, in response to an action of the eyelid on the lens body 14, thereby at least assisting in promoting effective tear fluid exchange, for example by consistently replenishing the PoLTF, as described elsewhere herein.

Advantageously, the microchannels 30 are preferably sized and adapted to promote effective tear fluid exchange between an exposed surface of the eye and a surface of the eye covered by the lens body 14.

Preferably, the present lenses are structured to increase tear mixing by at least about 15%, or at least about 20%, or at least about 25%, or at least about 30%, or at least about 35% or more when the lens is worn on the eye relative to an identical contact lens that does not include microchannels or that does not include microchannels structured as described and shown herein. For example, the present contact lenses preferably include a lens body structured to reduce the time required to exchange 95% of the tear fluid by at least about 15%, or at least about 20%, or at least about 25%, or at least about 30%, or at least about 35% or more when the contact lens is worn on an eye (for example, a human eye) relative to a substantially identical contact lens without microchannels or without microchannels structured in accordance with the present invention. As described herein, the present lenses provide enhanced tear exchange rates ranging from about 0.4% enhancement to at least 46% enhancement.

Each of the microchannels 30 preferably includes a curved surface 34, generally other than concave relative to the anterior face 17. More specifically, the curved surface 34 is generally convex relative to the anterior face 17 and is located in a posterior region of the microchannel 30.

Figure 3:
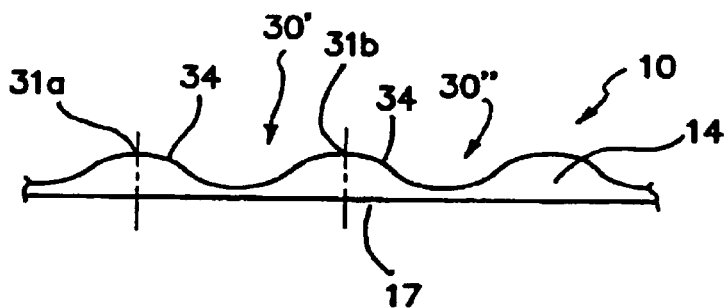
FIG. 3 is a schematic view of the microchannel configuration of the lens shown in FIG. 1.

This may be more clearly understood with reference to FIG. 3. FIG. 3 represents a cross section of the lens 10 along a portion of a particular radial distance from an optical axis of the lens body. For example, FIG. 3 may represent a thickness of the lens 10 at a radius or distance of about 4 mm from the optical axis of the lens body 14. Each microchannel, for example 30', is defined between apex 31a and apex 31b.

Preferably, as shown in FIG. 1, the curved surface 34 of each microchannel 30 is substantially continuously curved circumferentially. The lens body 14 therefor may be described as having a thickness which varies substantially continuously along a radius extending from the optical axis of lens body 14 across adjacent, abutting microchannels, for example, microchannels 30' and 30" in FIG. 3, with thickest portions being at apexes 31a and 31b. It should be noted that each apex 31a and 31b is an apex of two microchannels. For example, apex 31b is common to both microchannels 30' and 30".

Preferably, each microchannel is located in a substantially abutting relationship to one or more adjacent microchannels. For example, the curved surface of a particular microchannel is located in a substantially abutting relationship to a curved surface of one or more other microchannels. The plurality of microchannels 30 preferably defines a continuous, junctionless curved surface on at least a portion of the posterior face 16 of the lens 10. The present lenses, for example, such lenses which have at least partially junctionless microchannels, provide substantial wearer comfort benefits, for example, relative to contact lenses including microchannels, such as spaced apart microchannels, with junctions or discontinuities (discontinuous or sharp edges).

More preferably, the plurality of microchannels 30 define a waveform circumferentially. A waveform is defined herein as a continuous curve including an apex of at least two microchannels. Preferably, the waveform is a substantially continuous waveform. Even more preferably, the plurality of microchannels defines a substantially junctionless waveform. For example, each microchannel is preferably substantially junctionless along at least a portion of, preferably a major portion of, a length of the microchannel.

For example, in the embodiment shown in FIG. 1, the plurality of microchannels defines a continuous waveform, radiating from the optical zone 18 and extending across at least a portion of the peripheral portion 22 of the lens body 14. Preferably, the microchannels 30 are substantially smooth and continuously curved both radially and circumferentially. The waveform defined by the plurality of microchannels may be periodic, such as shown in FIG. 1. In other words, the microchannels may be substantially equidistant from apex to apex, though this is not necessarily so.

The thinnest region of the lens body 14 within each microchannel 30 may extend through about 5% or about 10% to about 30% or about 50% or about 80% of the maximum thickness of the lens body 14. Each microchannel 30 preferably has a decreasing taper toward the optical axis in terms of width from the peripheral edge 24 of the lens, toward the optical zone 18. Looked at from a different perspective, each microchannel 30 preferably has a maximum width, for example at about the periphery 24 of the lens.

The contact lens 10 is structured to promote tear fluid exchange between an exposed surface of the eye and a surface of the eye covered by the lens 10. The microchannels 30 are effective to promote or facilitate such tear fluid exchange and preferably create a substantially free flowing tear film in the lens eye interface. Moreover, the lens is structured to cause a flushing of at least some of the PoLTF upon each blink of the eye.

The plurality of microchannels 30 may include microchannels that have a depth dependent upon the thickness of the lens 10 itself. For example, each microchannel may have a depth of between about 0.1% to about 90% of a thickness of the particular lens body. In one embodiment, each microchannel has a depth of between about 10% and about 80% of a thickness of the lens body. For typical contact lens thicknesses, the microchannels in accordance with the invention have a depth of between about 0.1 micron and about 50 microns.

In the embodiment shown in FIG. 1, the plurality of microchannels 30 extend only into the peripheral portion 16 of the lens 10 and there is an absence of microchannels 30 in the optical zone 18. A junction or discontinuity may be present at the interface between the optical zone and each microchannel. Except for this junction, each of the microchannels preferably is completely junctionless. The plurality of microchannels 30 extend at least a portion of the posterior face 16 from the optical zone 18 to the lens periphery 24 preferably to the periphery 24. The absence of microchannels in the optical zone 18 reduces, or even substantially eliminates any detrimental effects that the microchannels 30 may have on the vision quality or optical zone function provided by contact lens 10.

In order to provide effective tear fluid exchange at the optical zone 18 in the absence of microchannels, the contact lens 10 may be structured such that the optical zone 18 of the lens 10 is somewhat anteriorly disposed relative to the surrounding peripheral portion 22, specifically relative to the part or surface of peripheral portion 22 located between the microchannels 30.

Although not specifically shown, as an alternative to microchannels having a relatively constant depth, each microchannel 30 may become increasingly more shallow (less deep) from the peripheral edge 24 toward the optical zone 18. Furthermore, the optical zone 18 may be anteriorly disposed a distance substantially equal to the depth of the most shallow portion of the microchannel 30. For example, the optical zone may be anteriorly disposed about 20 microns or about 10 microns or about 5 microns or less, relative to the peripheral portion 22.

Figure 4:
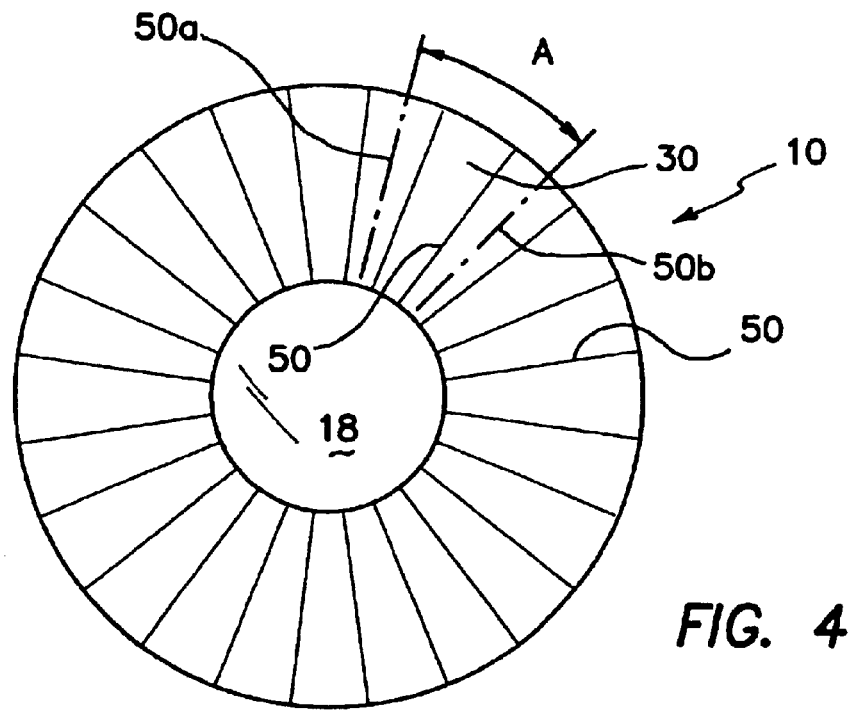
FIG. 4 is a plan view of the posterior face of the contact lens shown in FIG. 1.

FIG. 4 shows a plan view of the posterior face of the contact lens 10 shown in FIG. 1. In this view, each solid radially extending line (for example lines 50) represents a theoretical line where a curvature of the posterior surface 16 changes from a convex curve to a curve that is other than convex. In other words, lines 50 represent lines of inflection where the lens posterior surface changes from concave to convex. One microchannel 30 is defined as spanning an area A defined, for example, between dashed line 50a and dashed line 50b. In this particular embodiment 10, the plurality of microchannels 30 comprises twelve microchannels, wherein each microchannel 30 occupies an area spanning a width of about 30 degrees of the lens.

Preferably, the plurality of microchannels comprises about 3 to about 192 or about 200 microchannels, for example, the plurality of microchannels comprises about 5 or about 10 to about 100 microchannels. For example, FIG.

Figure 5:
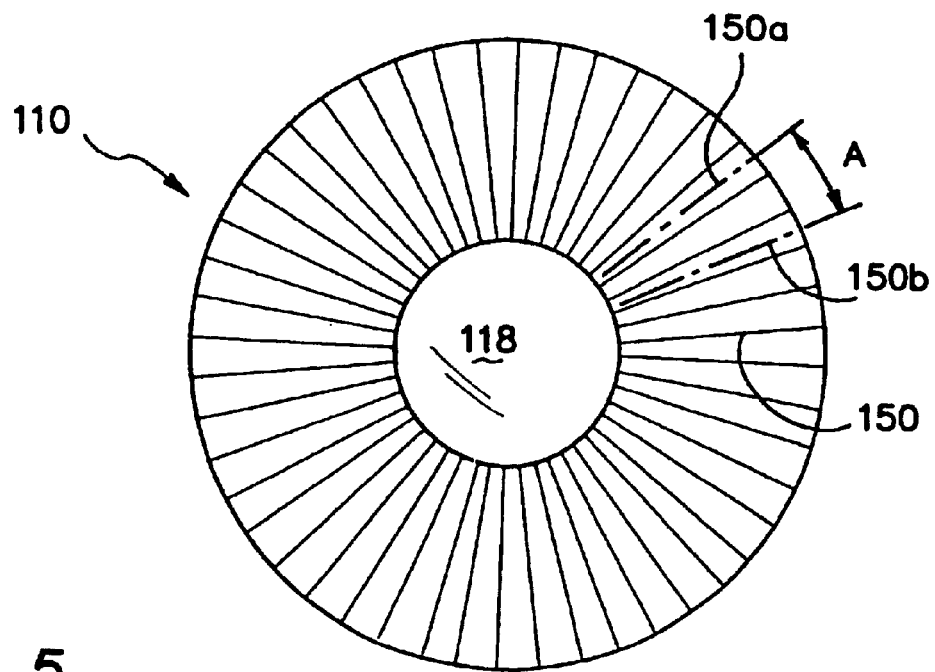
FIG. 5 is a plan view of a posterior face of another embodiment of a contact lens in accordance with the present invention.

5 shows a similar contact lens 110 in accordance with the present invention wherein the plurality of microchannels comprises 24 microchannels, with each microchannel occupying about 15 degrees of the lens 110. Unless stated otherwise herein, the lens 110 of FIG. 5 is structured and functions similarly to contact lens 10 of FIG. 1.

Turning now to FIGS. 6 and 7, another embodiment 210 of the invention is shown. Except as expressly described, contact lens 210 is structured and functions similar to contact lens 10. Components of lens 210 which correspond to components of lens 10 are identified by the same reference numeral increased by 200.

One of the primary differences between contact lens 210 and contact lens 10 relates to the structure of the microchannels 230. Specifically, the microchannels 230 each include a posterior portion defining a convexly curved surface 234 and a portion 240 that is not defined by a curved surface. This may be more clearly understood with reference to FIG. 8 which shows a schematic representation of lens 210 similar to FIG. 3. As shown, each microchannel 230 is defined between apexes, for example 230a, and 230b. The lens 210 therefore has a varying thickness at a particular radial distance from the lens optic center or central optical axis. However, in addition to curved surfaces 234, each microchannel 230 includes relatively flattened region 240. As shown, the flattened region 240 is at the thinner region of the lens body 214 whereas the curved surfaces 234 are at the thicker region of the lens body 214.

FIG. 8A shows another contact lens 310 in accordance with the present invention, similar to lens 210. Except as expressly described, contact lens 310 is structured and functions similar to contact lens 210. Components of lens 310 which correspond to components of lens 10 are identified by the same reference numeral increased by 300.

The primary difference between lens 310 and lens 210 relates to a larger surface area of each flattened region 340. This illustrates that the present contact lenses can have a wide variety of differently sized, shaped and configured microchannels and still be within the scope of the present invention.

In another aspect of the present invention, contact lenses are provided, which comprise lens bodies structured to provide enhanced tear mixing to one or more particular groups of individuals, for example, individuals with particular eye and/or eyelid anatomical and physiological features. Advantageously, the present contact lenses include lens bodies structured to provide enhanced tear mixing to individuals who have increased eyelid tension relative to other individuals who have a reduced degree of, or less, eyelid tension. In one embodiment, contact lenses are structured to provide enhanced tear mixing for an Asian person, as compared to a non-Asian person. In general, it is believed that Asian people, that is persons or humans of Asian extractions or ancestry, such as Chinese, Japanese, Korean, and the like extraction or ancestries, have increased eyelid tension relative to non-Asian people, that is persons or humans of non-Asian extraction or ancestry. Although this is generally believed to be true, it should be noted that not all Asian persons have increased eyelid tension relative to all non-Asian persons. A representative group of about 10 to about 15 Asian persons has a higher average eyelid tension relative to a representative group of about 10 to about 15 non-Asian persons.

In another embodiment, contact lenses are provided including lens bodies structured to provide enhanced tear mixing in individuals who do not have generally increased eyelid tensions. Advantageously, such lenses have lens bodies that include a plurality of microchannels, as herein disclosed, except that the microchannels are present in a lower density, that is fewer microchannels, than contact lenses configured for people with increased eyelid tensions.

In another embodiment, the present contact lenses include lens bodies structured to provide enhanced tear mixing to individuals with palpebral aperture sizes that are associated with relatively thick PoLTF, such as Asian individuals. In additional embodiments, the present contact lenses include lens bodies that are structured to provide enhanced tear mixing to individuals with other anatomical characteristics, including, and not limited to, eyelid characteristics that influence the ability of the eyelid to generate force on the eyeball during blinking, characteristics of the tarsal plate (e.g., the size and/or thickness of the tarsal plate), eyelid thickness, the presence or absence of folds in the eyelid, aperture size, anterior ocular surface topography (e.g., corneal topography, topography of the limbus, and topography of the corneal limbus and sclera), the positioning of the eyeball with respect to lid, and eyeball proptosis (e.g., the ability of the eyeball to move backward when the eyelid blinks).

These contact lenses for a particular group of individuals are manufactured using methods disclosed herein, and also including one or more additional steps of designing the contact lenses to be structured to provide enhanced tear mixing to the desired group of individuals, such as, individuals with certain eye and/or eyelid characteristics, which include eye shape, musculature, eyelid tension, and the like. Accordingly, contact lenses and methods of making contact lenses that provide enhanced tear mixing for particular or specific groups or populations of people are within the scope of the invention herein disclosed.

The lenses of the present invention are preferably manufactured using computerized lathing techniques. Alternatively, the lenses can be manufactured by using any suitable conventional manufacturing technique or combination thereof. Many such techniques or processes are conventional and/or well known in the art. Such processes include, for example, turning, laser-machining, swaging, injection moulding, casting (semi-mould, full mould) and the like and combinations thereof.

The contact lenses 10, 110, 210, 310 in accordance with the invention are preferably flexible, soft silicone or hydrophilic silicone lenses or soft lenses made from other hydrophilic materials, such as suitable hydrogel-forming polymeric materials and the like. However, with appropriate modifications, the present contact lenses may be "hard" or "rigid" lenses. The present contact lenses are particularly adapted for extended wear, for example, the lenses can be worn from about 1 day to about 14 days or more without removal, or for disposable lenses. Materials which are suitable for use in the present lenses include, without limitation, conventional hydrogel materials, for example, hydroxyethyl methacrylate-based materials, silicone-hydrogel materials, gas permeable materials, lens materials described in Nicolson et al U.S. Pat. No. 5,849,811, other ophthalmically compatible lens materials, for example, many of which are well known to those skilled in the art, and the like and combinations thereof.

Preferably, the contact lenses 10, 110, 210 and 310, are of the present invention are produced by lathing the microchannels onto a tooling insert that is subsequently used to produce a mold for the contact lens product. Hardware such as a variform attachment Fast tool servo on an Optiform lathe can be utilized to provide a tool insert with the desired geometry. For example, the tool servo can be programmed to lathe the tool insert in 24 semi-meridians (equi-spaced, 15 degrees apart) to produce the lens shown in FIG. 1. The tool servo can be programmed using known techniques, for example using Minifiles, which is conventional and well known by those of skill in the art, to describe the surface to be lathed point by point. The tool servo can be additionally programmed such that both or either of the depth and width of the microchannels can be varied. It is noted that the depth of the microchannel need not be constant along its length, i.e. the channel could be made to get deeper, then shallower from the optic to the peripheral edge. The depth, width and/or configuration of the microchannels may be varied from microchannel to microchannel. Of course, the microchannel depth at the edge of the lens cannot be deeper than the lens edge thickness.

The hardware for lathing the insert tool can be appropriately modified to cut up to about 384 meridians in order to allow for greater flexibility in lens design.

The following non-limiting example shows the amount or relative degree of tear mixing that occurs when the present lenses are worn on an eye in comparison to a conventional lens without microchannels.

EXAMPLE

Tear mixing under a soft contact lens can be estimated by measuring the time required for a tracer material (e.g., dye, microspheres, red blood cells or the like) to be removed from under the contact lens. Most tear-mixing estimates are made using a fluorometer, which can measure the change in fluorescence under a contact lens over a specified wearing period. Typically, either high-molecular-weight sodium fluorescein (Fluorosoft®, MW=600 Da) or a dye formulated as a fluorescein/dextran combination (FITC-dextran, Smith Chemical; MW=1–12 kDa) is used in the fluorometric measurement. Fluorosoft® is absorbed by lenses with water contents greater than about 50%. Therefore, preferably FITC-dextran (MW=9–12 kDa) is used to avoid underestimates of tear mixing that might occur with lens or ocular absorption of the tracer dye.

Two fluorometric methods are currently used to estimate tear mixing. One technique uses a modified slit lamp with light focused on the PoLTF as changes in fluorescence intensity (FI) are monitored. This technique has the advantage of placing an excitation light directly on the target area (e.g., tear film). An alternate fluorometric technique uses a scanning fluorometer (Ocumetrics, Inc., Mountain View, Calif.) that drives the excitation light from the pre-lens tear film (PrLTF) to the cornea using a computer-driven stepper motor. The instrument makes a series of fluorescence-intensity readings and provides FI data centered around the peak FITC-dextran fluorescence under the lens. This instrument is very sensitive to low levels of fluorescent dye. Unfortunately, since the placement of the light cannot be controlled precisely, the tear-mixing estimate assumes that there is no fluorescence on the anterior lens surface. This assumption is considered to be valid for lenses with slow tear-mixing rates but may not be accurate for lenses with efficient tear mixing. These instruments are conventional and details of each instrument are generally understood by those of skill in the art.

A procedure for estimating tear mixing is as follows: Baseline ($B_o$) autofluorescence readings (cornea+lens) are obtained with the lens on the eye of each subject. The lens is then removed, a small amount (e.g., 1 µl) of FITC-dextran is placed on the posterior lens surface, and then the lens is re-inserted directly onto the cornea. Next, the FI is monitored for 30 minutes. Subjects are either allowed to blink at their normal rate or asked to blink at a rate of 15 blinks/min (average blink rate) cadenced using a metronome. The rate of dye depletion is determined by fitting an exponential-decay model to the FI values obtained over the 30 minute observation period. After approximately 30 minute, there is little or no detectable change in FITC-dextran intensity.

The exponential decay rate is expressed as a time constant, T, defined as the time required to deplete 37% of dye from under the lens per unit of time, T. For the computation, the first 5 minutes of data are eliminated because reflex tearing may occur as the lens is initially inserted. The efficiency of tear mixing is expressed as the time required to deplete 95% of the dye from under the lens, or 3T, which is denoted as $T_{95}$. Advantageously, $T_{95}$ can be obtained immediately from the fluorescence-intensity decay data without further data manipulation. The procedure described above was performed in Dr. Kenneth Polse's laboratory at the University of California, Berkeley.

Actual $T_{95}$ data obtained during experimentation on twenty-six patients wearing channeled lenses in accordance with the present invention, particularly, blended microchanneled lenses having 12 microchannels, at 30° peak to peak, similar to contact lens 10 shown in FIGS. 1–3, and the same twenty-six patients wearing substantially identical but non-channeled lenses are shown in Table 1 and Table 2 below.

TABLE 1

| Channeled lenses $T_{95}$ – c | Non-channeled lenses $T_{95}$ – non | $\Delta T_{95}$ |
| --- | --- | --- |
| 25.33 | 45.50 | 20.18 |
| 22.98 | 31.17 | 8.20 |
| 19.90 | 37.20 | 17.30 |
| 23.71 | 19.91 | -3.80 |
| 20.66 | 29.49 | 8.82 |
| 20.52 | 23.27 | 2.75 |
| 22.35 | 35.80 | 13.45 |
| 33.84 | 23.45 | -10.39 |
| 23.63 | 40.28 | 16.64 |
| 25.32 | 33.83 | 8.51 |
| 28.73 | 43.11 | 14.38 |
| 23.25 | 29.29 | 6.04 |
| 25.82 | 31.68 | 5.86 |
| Mean = 24.31 | Mean = 32.61 | Mean = 8.30 | p-value < 0.05

TABLE 2

| Channeled lenses $T_{95}$ – c | Non-channeled lenses $T_{95}$ – non | $\Delta T_{95}$ |
| --- | --- | --- |
| 21.93 | 30.02 | 8.09 |
| 25.20 | 23.04 | -2.16 |
| 28.59 | 21.13 | -7.45 |
| 42.98 | 61.93 | 18.95 |
| 21.62 | 21.70 | 0.09 |
| 25.51 | 23.29 | -2.22 |
| 34.10 | 36.71 | 2.61 |
| 29.10 | 24.95 | -4.15 |
| 33.88 | 23.03 | -10.84 |
| 28.40 | 30.51 | 2.11 |
| 49.47 | 41.50 | -7.97 |
| 21.42 | 31.17 | 9.76 |
| 30.56 | 30.2 | -.36 |
| Mean = 30.21 | Mean = 30.71 | Mean = 0.50 | p-value > 0.05

Table 1 represents data obtained from thirteen Asian patients, and table 2 represents data obtained from thirteen non-Asian patients.

When the data are pooled, the mean $T_{95}$ for the channeled contact lenses is 27.26 minutes, and the mean $T_{95}$ for the non-channeled contact lenses is 31.66 minutes. The channeled lenses significantly increased the tear exchange rate, or reduced the tear exchange time (P<0.05). In other words, there was an overall change of approximately 14% in tear exchange time, or an overall enhancement of tear exchange rate of approximately 14%.

When the data from the seventeen patients (of the twenty-six patients) that showed decreased tear exchange times, or enhanced tear exchange rate, are examined, the mean $T_{95}$ for the channeled contact lenses is 25.23 minutes, and the mean $T_{95}$ for the non-channeled contact lenses is 34.86 minutes, resulting in an overall reduction in tear exchange time of approximately 28%. The tear exchange rate was enhanced by at least 0.4%, and was more typically enhanced by at least 6%. At least 45% improvements in tear exchange rate were also observed.

When the data from the patients who showed a decreased tear exchange time are categorized into Asian and non-Asian patients, additional differences in tear exchange rates for the Asian patients and non-Asian patients are apparent. For example, the mean $T_{95}$ for the channeled contact lenses for the Asian patients is 23.50 minutes and the mean $T_{95}$ for the non-channeled contact lenses for the Asian patients is 34.60 minutes, resulting in a difference of about 11.10 minutes, or about a 26% change in tear exchange time. In comparison, the mean $T_{95}$ for the channeled contact lenses for the non-Asian patients is 28.41 minutes, and the mean $T_{95}$ for the non-channeled contact lenses for the non-Asian patients is 35.34 minutes, resulting in a difference of about 6.94 minutes, or about a 20% change in tear exchange time.

In addition, the data demonstrate that the contact lenses used in this example provided enhanced tear mixing to a greater percentage of Asian people (approximately 85%) compared to the non-Asian people (approximately 46%).

Thus, the above data confirm that the lenses herein disclosed provide substantial advantages over lens without channels in terms of enhanced tear exchange. In addition, the data confirm that certain lens configurations may be preferred for different individuals or populations of people who have particular eye and/or eyelid anatomical and physiological features. In other words, lenses with one configuration of microchannels may exhibit improved tear exchange rates for Asian subjects, and lenses with a different configuration of microchannels, such as decreased channel density or greater distances between apices of microchannels, may exhibit improved tear exchange rates for non-Asian subjects.

While this invention has been described with respect to various specific examples and embodiments, it is to be understood that the invention is not limited thereto and that it can be variously practiced within the scope of the following claims.

What is claimed is:

1. A contact lens for use on an eye, the lens comprising:
   a lens body having a posterior face and an anterior face; and
   a plurality of microchannels defined in the posterior face of the lens body and defining a substantially continuous waveform circumferentially,
   the lens body being structured to reduce the time to exchange 95% of tear fluid by at least about 5% when the contact lens is worn on an eye relative to a substantially identical contact lens without a plurality of microchannels.

2. The contact lens of claim 1 wherein the lens body is structured to reduce the time to exchange 95% of tear fluid by at least about 15% when the contact lens is worn on the eye relative to a substantially identical contact lens without a plurality of microchannels.

3. The contact lens of claim 1 wherein the lens body is structured to reduce the time to exchange 95% of tear fluid by at least about 20% when the contact lens is worn on the eye relative to a substantially identical contact lens without a plurality of microchannels.

4. The contact lens of claim 1 wherein the lens body is structured to reduce the time to exchange 95% of tear fluid by at least about 25% when the contact lens is worn on the eye relative to a substantially identical contact lens without a plurality of microchannels.

5. The contact lens of claim 1 wherein the lens body is structured to reduce the time to exchange 95% of tear fluid by at least about 30% when the contact lens is worn on the eye relative to a substantially identical contact lens without a plurality of microchannels.

6. The contact lens of claim 1 wherein the lens body is structured to reduce the time to exchange 95% of tear fluid by at least about 35% when the contact lens is worn on the eye relative to a substantially identical contact lens without a plurality of microchannels.

7. The contact lens of claim 1 wherein each microchannel of the plurality of microchannels defines a waveform circumferentially.

8. The contact lens of claim 1 wherein at least two of the microchannels define a waveform circumferentially.

9. The contact lens of claim 1 wherein each microchannel of the plurality of microchannels defines a substantially junctionless waveform circumferentially.

10. The contact lens of claim 1 wherein the plurality of microchannels defines a substantially junctionless waveform circumferentially.

11. The contact lens of claim 1 wherein each of the microchannels comprises a microchannel which is substantially junctionless along at least a portion of a length of the microchannel.

12. The contact lens of claim 1 wherein each of the microchannels comprises a microchannel which is substantially junctionless along a major portion of a length of the microchannel.

13. The contact lens of claim 1 wherein the lens body includes an optical zone which is substantially free of the plurality of microchannels.

14. The contact lens of claim 1 wherein the plurality of microchannels comprises microchannels each of which has a width in a range of about 5 degrees to about 30 degrees.

15. The contact lens of claim 1 wherein the plurality of microchannels comprises about 3 to about 200 microchannels.

16. The contact lens of claim 1 wherein the plurality of microchannels comprises about 10 to about 100 microchannels.

17. The contact lens of claim 1 wherein the lens body is structured to enhance tear mixing of post-lens tear film when the contact lens is worn on an eye of an Asian person relative to tear mixing of post-lens tear film provided by an identically structured contact lens worn on an eye of a non-Asian person.

18. A contact lens for use on an eye, the lens comprising:
   a lens body having a posterior face, and an anterior face; and
   a plurality of microchannels having a non-circular length and being defined in the posterior face of the lens body, each of the microchannels formed by spaced apart and substantially opposing first and second convex surfaces relative to the anterior face, each convex surface being substantially symmetrical, and a non-convex surface located between the first and the second convex surfaces, the microchannels sized and adapted to promote effective tear fluid exchange between an exposed surface of the eye and a surface of the eye covered by the lens body.

19. The contact lens of claim 18 wherein the lens body is structured to reduce the time to exchange 95% of tear fluid by at least about 5% when the contact lens is worn on the eye relative to a substantially identical contact lens without a plurality of microchannels.

20. The contact lens of claim 18 wherein the lens body is structured to reduce the time to exchange 95% of tear fluid by at least about 15% when the contact lens is worn on the eye relative to a substantially identical contact lens without a plurality of microchannels.

21. The contact lens of claim 18 wherein the lens body is structured to reduce the time to exchange 95% of tear fluid by at least about 35% when the contact lens is worn on the eye relative to a substantially identical contact lens without a plurality of microchannels.

22. The contact lens of claim 18 wherein the non-convex surface is substantially planar.

23. The contact lens of claim 18 wherein each of the microchannels includes a curved surface and wherein the curved surface of each microchannel is substantially continuously curved circumferentially.

24. The contact lens of claim 18 wherein the lens body has a thickness which varies substantially continuously along a radius extending from an optical axis of the lens body circumferentially across at least a portion of each of the microchannels.

25. The contact lens of claim 18 wherein the lens body has a thickness which varies substantially continuously along a radius extending from an optical axis of the lens body circumferentially across a manor portion of the each of the microchannel.

26. The contact lens of claim 18 wherein the non-convex surface is substantially concave.

27. The contact lens of claim 18 wherein each of the microchannels is substantially junctionless along a portion of a length of the microchannel.

28. The contact lens of claim 18 wherein each of the microchannels is substantially junctionless along a major portion of a length of the microchannel.

29. The contact lens of claim 18 which includes an optical zone which is substantially free of the plurality of microchannels.

30. The contact lens of claim 18 wherein the plurality of microchannels comprise microchannels each of which has a width in a range of about 5 degrees to about 30 degrees.

31. The contact lens of claim 18 wherein the plurality of microchannels comprises about 3 to about 200 microchannels.

32. The contact lens of claim 18 wherein the plurality of microchannels comprises about 10 to about 100 microchannels.

33. The contact lens of claim 18 wherein the lens body is structured to enhance tear mixing of pout-lens tear film when the contact lens is worn on an eye of an Asian person relative to tear mixing of post-lens tear film provided by an identically structured contact lens worn on an eye of a non-Asian person.

34. A contact lens for use on an eye, the lens comprising:
a lens body having a posterior face and an anterior face;
a plurality of microchannels having a non-circular length arid being defined in the posterior face of the lens body, each of the microchannels being located between a first apex of a first substantially symmetrical convex posterior surface portion relative to the anterior face of the lens body and a second apex of a second substantially symmetrical convex posterior surf ace portion relative to the anterior face of the lens body in a substantially abutting relationship to one or more of the microchannels, the microchannels sized and adapted to promote effective tear fluid exchange between an exposed surface of the eye and a surface of the eye covered by the lens body.

35. The contact lens of claim 34 wherein the lens body is structured to reduce the time to exchange 95% of tear fluid by at least about 5% when the contact lens is worn on the eye relative to a substantially identical contact lens without a plurality of microchannels.

36. The contact lens of claim 34 wherein the lens body is structured to reduce the time to exchange 95% of tear fluid by at least about 15% when the contact lens is worn on the eye relative to a substantially identical contact lens without a plurality of microchannels.

37. The contact lens of claim 34 wherein the lens body is structured to reduce the time to exchange 95% of tear fluid by at least about 35% when the contact lens is worn on the eye relative to a substantially identical contact lens without a plurality of microchannels.

38. The contact lens of claim 34 wherein the lens body has a thickness which varies substantially continuously along a radius extending from an optical axis of the lens body across a major portion of each of the microchannels.

39. The lens of claim 34 wherein each of the microchannels comprises a microchannel which is substantially junctionless along a major portion of a length of the microchannel.

40. The contact lens of claim 34 which includes an optical zone which is substantially free of the plurality of microchannels.

41. The contact lens of claim 34 wherein the plurality of microchannels comprise microchannels each of which has a width in a range of about 5 degrees to about 30 degrees.

42. The contact lens of claim 34 wherein the plurality of microchannels comprise about 3 to about 200 microchannels.

43. The lens of claim 34 wherein the plurality of microchannels comprise about 10 to about 100 microchannels.

44. The contact lens of claim 34 wherein the lens body is structured to enhance tear mixing of post-lens tear film when the contact lens is worn on an eye of an Asian person relative to tear mixing of post-lens tear film provided by an identically structured contact lens worn on an eye of a non-Asian person.

45. A contact lens for use on an eye, the lens comprising:
a lens body having a posterior face and including a plurality of microchannels defined in the posterior face, the microchannels being effective to provide enhanced tear mixing of post-lens tear film of a person of a desired group of people when worn on an eye of the person relative to a substantially identical contact lens worn by another person of a different group of people.

46. The contact lens of claim 45 wherein the lens body is structured to provide enhanced tear mixing of post-lens tear film of a person of a group of people who have eye or eyelid characteristics specific for the group of people.

47. The contact lens of claim 45 wherein the lens body is structured to provide enhanced tear mixing of post-lens tear film of a person of a group of people who have increased eyelid tension relative to a different group of people.

48. The contact lens of 45 wherein the lens body is structured to enhance tear mixing when the contact lens is worn on an eye of an Asian person relative to tear mixing provided by an identically structured contact lens worn on an eye of a non-Asian person.

49. The contact lens of claim 45 wherein the lens body is structured to enhance tear mixing when the contact lens is worn on an eye of a non-Asian person relative to tear mixing provided by an identically structured contact lens worn on an eye of an Asian person.

50. The contact lens of claim 18 wherein the plurality of microchannels defines a substantially continuous, substantially junctionless waveform circumferentially.

* * * * *